United States Patent
Fujikado et al.

(10) Patent No.: US 9,594,258 B2
(45) Date of Patent: Mar. 14, 2017

(54) CONTACT LENS HAVING MYOPIA PROGRESSION SUPPRESSION CAPABILITY, AND CONTACT LENS SET HAVING MYOPIA PROGRESSION SUPPRESSION CAPABILITY

(71) Applicants: OSAKA UNIVERSITY, Suita-shi, Osaka (JP); MENICON CO., LTD., Nagoya-shi, Aichi (JP)

(72) Inventors: Takashi Fujikado, Suita (JP); Mitsuhiko Nakada, Nagoya (JP); Asaki Suzaki, Nagoya (JP); Yukihisa Sakai, Nagoya (JP)

(73) Assignees: OSAKA UNIVERSITY, Suita-shi (JP); MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 14/426,584

(22) PCT Filed: Sep. 25, 2013

(86) PCT No.: PCT/JP2013/075892
§ 371 (c)(1),
(2) Date: Mar. 6, 2015

(87) PCT Pub. No.: WO2014/050879
PCT Pub. Date: Apr. 3, 2014

(65) Prior Publication Data
US 2015/0219926 A1 Aug. 6, 2015

(30) Foreign Application Priority Data
Sep. 25, 2012 (JP) ................. 2012-211360

(51) Int. Cl.
*G02C 7/04* (2006.01)

(52) U.S. Cl.
CPC ............. *G02C 7/047* (2013.01); *G02C 7/04* (2013.01); *G02C 7/044* (2013.01);
(Continued)

(58) Field of Classification Search
CPC ....................................... G02C 7/047
(Continued)

(56) References Cited

U.S. PATENT DOCUMENTS

| 5,100,225 A | 3/1992 | Rothe |
| 5,422,687 A | 6/1995 | Tanaka et al. |

(Continued)

FOREIGN PATENT DOCUMENTS

| EP | 0 949 529 A2 | 10/1999 |
| EP | 0982618 A1 | 3/2000 |

(Continued)

OTHER PUBLICATIONS

Mar. 31, 2015 International Preliminary Report on Patentability issued in International Application No. PCT/JP2013/075892.
(Continued)

*Primary Examiner* — Darryl J Collins
(74) *Attorney, Agent, or Firm* — Oliff PLC

(57) ABSTRACT

The present invention provides a contact lens having novel myopia progression suppression capability, while enabling a good QOV to be obtained and ensuring myopia is kept from progressing. A contact lens having a refractive correction power for correcting myopia and myopic astigmatism set in a central region of an optical part, wherein a positive addition power in comparison with a power in the central region is set in a peripheral region of the optical part so that progression of the myopia or myopic astigmatism is suppressed, a positioning member is provided that specifies a circumferential position of the lens under a worn condition, and a lens optical axis of the optical part is set offset from
(Continued)

a lens geometric center to align with a line of sight of a human eye under the worn condition produced by the positioning member.

15 Claims, 9 Drawing Sheets

(52) U.S. Cl.
CPC ..... *G02C 2202/04* (2013.01); *G02C 2202/06* (2013.01); *G02C 2202/24* (2013.01)

(58) Field of Classification Search
USPC ............ 351/159.07, 159.16, 159.22, 159.23, 351/159.28, 159.69, 159.79
See application file for complete search history.

(56) References Cited

U.S. PATENT DOCUMENTS

| | | | |
|---|---|---|---|
| 5,650,837 A | 7/1997 | Roffman et al. | |
| 6,142,625 A * | 11/2000 | Sawano | G02C 7/042 351/159.07 |
| 6,158,861 A | 12/2000 | Oyama et al. | |
| 6,199,982 B1 | 3/2001 | Oyama et al. | |
| 7,025,460 B2 | 4/2006 | Smitth et al. | |
| 2008/0291393 A1* | 11/2008 | Menezes | G02C 7/04 351/159.12 |
| 2010/0259720 A1 | 10/2010 | Goto et al. | |
| 2011/0051079 A1 | 3/2011 | Martinez et al. | |
| 2012/0320333 A1* | 12/2012 | Holden | G02C 7/041 351/159.05 |

FOREIGN PATENT DOCUMENTS

| | | |
|---|---|---|
| JP | 48013048 | 2/1973 |
| JP | H07239459 A | 9/1995 |
| JP | H08304745 A | 11/1996 |
| JP | H11258553 A | 9/1999 |
| JP | 2000075251 A | 3/2000 |
| JP | 2007511803 A | 5/2007 |
| JP | 2009169104 A | 7/2009 |
| JP | 2010528339 A | 8/2010 |
| JP | 2011518355 A | 6/2011 |
| WO | 9616621 A1 | 6/1996 |
| WO | 2008/144497 A1 | 11/2008 |
| WO | 2009/129528 A1 | 10/2009 |
| WO | 2011/025846 A1 | 3/2011 |

OTHER PUBLICATIONS

Dec. 15, 2015 Office Action issued in Japanese Patent Application No. 2014-538525.
Dec. 3, 2013 International Search Report issued in International Application No. PCT/JP2013/075892.
Sankaridurg, Padmaja, et al., "Decrease in Rate of Myopia Progression with a Contact Lens Designed to Reduce Relative Peripheral Hyperopia: One-Year Results," Investigative Ophthamology & Visual Science, Dec. 2011, vol. 52, No. 13, pp. 9362-9367.
Anstice, Nicola S., et al., "Effect of Dual-Focus Soft Contact Lens Wear on Axial Myopia Progression in Children," American Academy of Ophthalmology, 2011, pp. 1152-1161.
Apr. 22, 2016 Search Report issued in European Application No. 13842348.8.

* cited by examiner

FIG.8
DEPTH OF FOCUS (D)
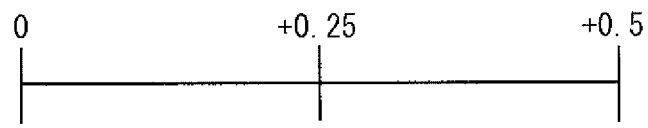
COMPARATIVE EXAMPLE 1 
EXAMPLE 1 

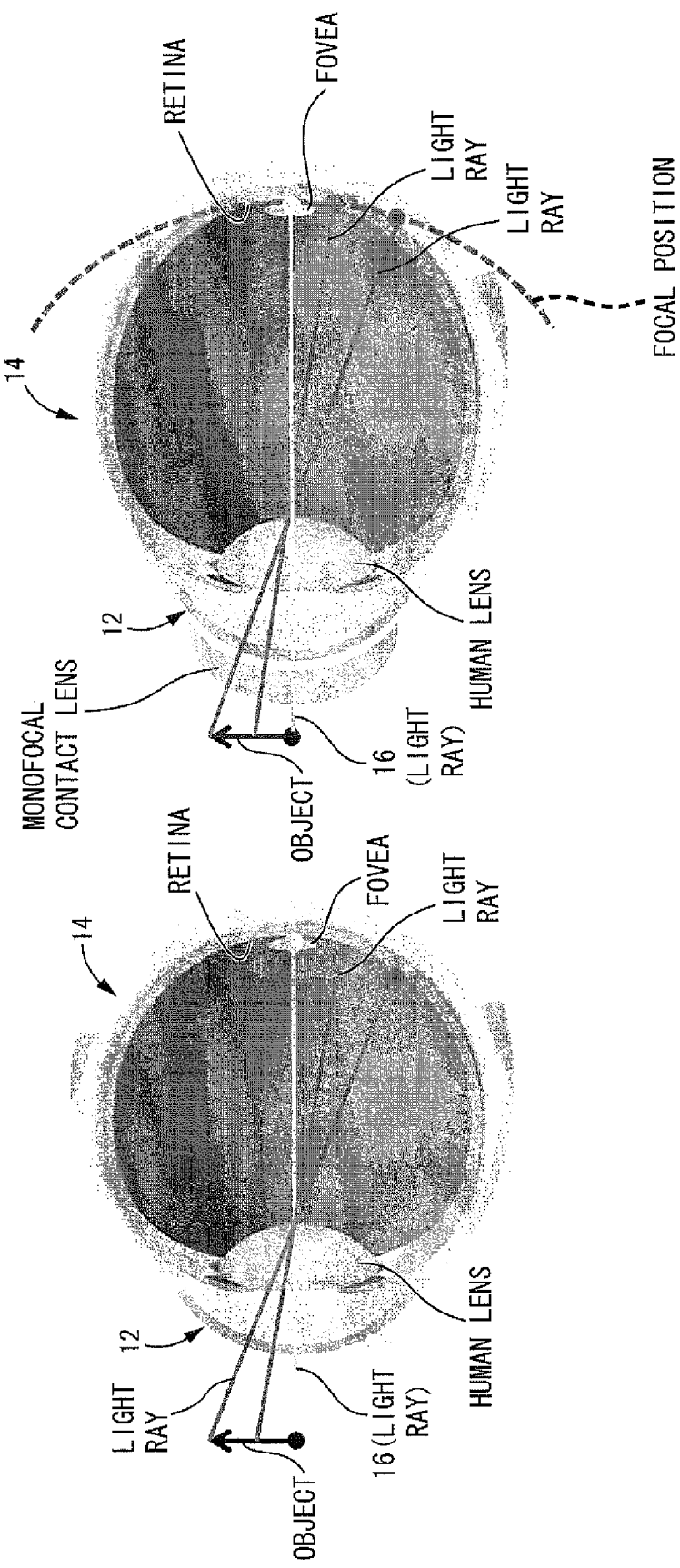

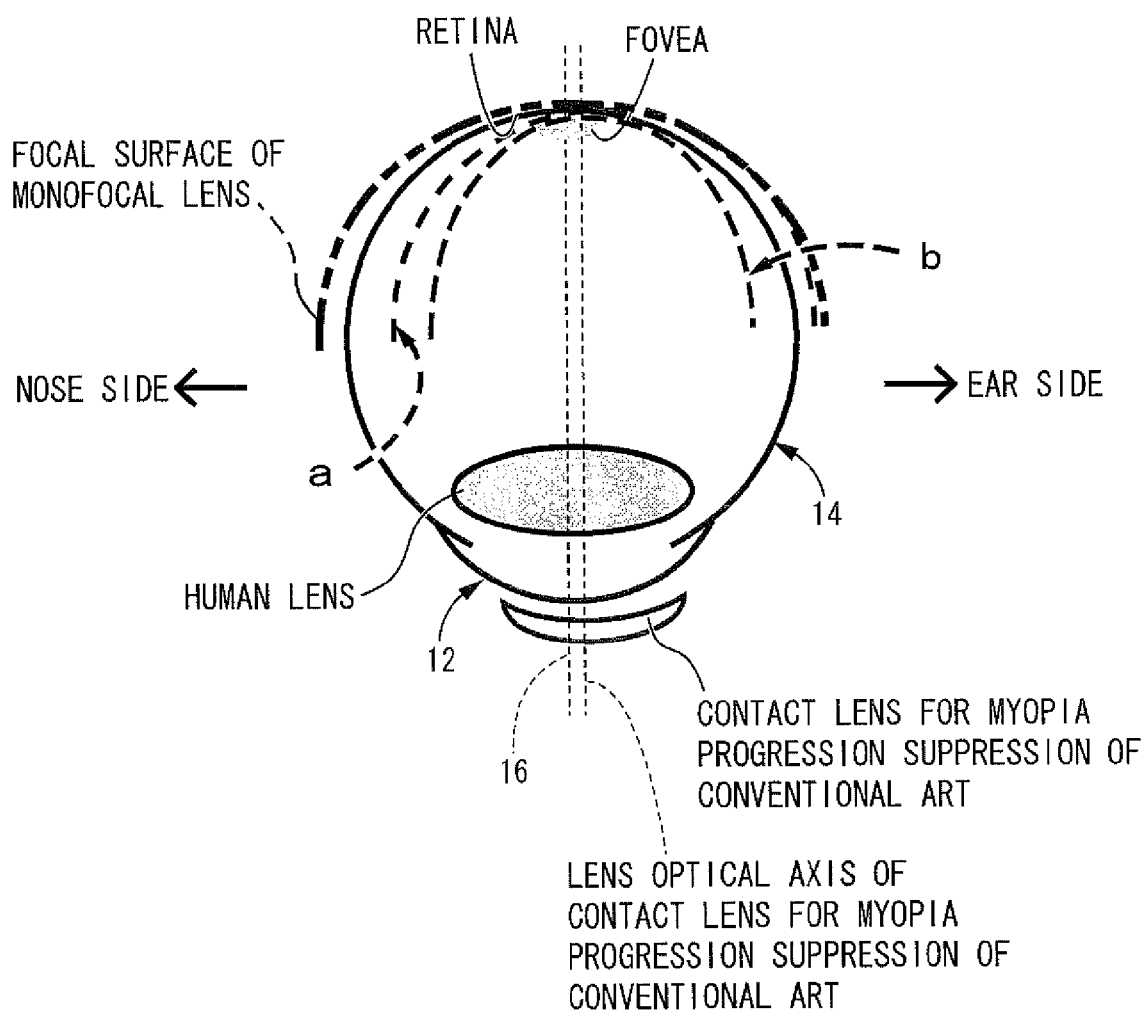

CONTACT LENS HAVING MYOPIA PROGRESSION SUPPRESSION CAPABILITY, AND CONTACT LENS SET HAVING MYOPIA PROGRESSION SUPPRESSION CAPABILITY

TECHNICAL FIELD

The present invention relates to the art of contact lenses having a myopia progression suppression capability used to suppress the progression of myopia and myopic astigmatism in the human eye.

BACKGROUND ART

It has been pointed out that myopia in the human eye not only brings inconvenience to our everyday life but also increases risk of disorders such as retinal detachment and cataract as the myopia gets deteriorated. Especially in recent years, the prevalence of myopia has been increasing so much that the social demand for technologies of myopia progression suppression is growing.

As one of such technologies of myopia progression suppression, a myopia progression suppression technology using a contact lens is proposed based on the accommodation lag theory and the off-axis aberration theory. Myopia progression especially in infants is often caused by progression of axial myopia, and since myopia and myopic progression are considered to be triggered by hyperopic focal error wherein the image is focused at a location behind the retina to develop further by having the ocular axis extended due to retinal extension that compensates the hyperopic focal error, the effect of such technology of myopia progression suppression is anticipated. The accommodation lag theory explains that the autofocus mechanism of the human eye does not fully respond to the required accommodation thereof, but as a result of the eye's tendency to work with minimum accommodation, it generates the accommodation lag, which is hyperopic focal error caused by the lack of accommodation in a condition of near vision that requires it, and therefore, the more work is involved in near vision, the more myopia progresses by having the ocular axis extended further, which is triggered by the hyperopic focal error. Also, the off-axis aberration theory deals with myopia progression prompted by the extended ocular axis triggered by generation of hyperopic focal error around the retina even with the foci coinciding on the retina in its central region because of the tendency for the myopic eyeball to take an elongated shape in the direction of ocular axis.

A specific method of suppressing myopia progression based on the accommodation lag theory and the off-axis aberration theory, as described in Japanese Domestic Publication of International Patent Application No. JP-A-2007-511803 (Patent Document 1) and International Publication No. WO96/16621 (Patent Document 2) for example, is to use a contact lens for correcting hyperopic focal error to let the light incident on the pupil focused on or before the retina.

That is, the invention described in Patent Document 1 referred to above takes a closer look at the phenomenon wherein the image focuses behind the retina in the retinal peripheral region when a monofocal contact lens is applied to a myopic eye with its optical axis grown and the lens power is set such that the central light rays focus on the retina. Therefore, as the lens for myopia progression suppression described in Patent Document 1, the one with different lens powers set at the central and peripheral portions is adopted, for example, so that one lens power is set to focus on the retina in the central region whereas the other lens power is set to focus on or before the retina in the retinal peripheral region.

However, repeated studies on contact lenses for myopia progression suppression with such conventional structure performed by the inventor found that high additional power of as much as +2.0 D is required for correcting the hyperopic focal error in the retinal peripheral region in order to obtain a desired effect of myopic progression suppression. That revealed the problems of reduced rate of light collection on the retina in far vision as well as generation of myopic focal error, leading to deterioration of subjective QOV (Quality of Vision). Especially, since the contact lens for myopia progression suppression is often worn by infants for a long period of time, the conventionally structured contact lenses for myopia progression suppression that fail to attain QOV equivalent to that of a regular contact lens for refractive correction posing a risk of disrupting the daily life of the wearer had some room for improvements.

Also, the invention described in Patent Document 2 referred to above corrects the hyperopic focal error by means of setting a value of lens power under a condition of spherical aberration wherein the focus gradually moves out toward the positive side of diopter toward the outer peripheral side in the radial direction of the lens, in addition to setting a focus that properly corrects the myopia on the optical axis, and then setting a focus on the optical axis at a location closer to the cornea. However, the invention inevitably had the same problem of significant reduction of QOV as the one described in Patent Document 1 due to the lack of clear focus as in the case of a progressive multifocal lens. Especially, there was a risk of causing disruption in daily life because a high additional power of as much as +2.0 D compared to a proper condition for myopic correction is set in anticipation for suppressing myopia progression, as is the case with the invention described in Patent Document 1.

BACKGROUND ART DOCUMENT

Patent Document

Patent Document 1: JP-A-2007-511803
Patent Document 2: WO96/16621

SUMMARY OF THE INVENTION

Problem the Invention Attempts to Solve

The present invention was made against the background described above, and the problem to be solved is to provide a contact lens having a novel function of myopia progression suppression that allows us to set a proper and minimal additional power required to correct the hyperopic focal error in the retinal peripheral region or on the optical axis, while allowing us to secure the effect of myopia progression suppression based on the accommodation lag theory and the off-axis aberration theory, and is able to obtain good QOV equivalent to that of a regular contact lens for refractive correction to the extent not to disrupt the daily life of the wearer.

Means for Solving the Problem

Aspects of the present invention provided to solve the above-mentioned problem will be described below. Also, the components adopted in each of the following aspects can be adopted in any combination as possible.

A first aspect of the present invention provides a contact lens having a myopia progression suppression capability whose optical part includes a refractive correction power set in a central region for correcting myopia and myopic astigmatism, the contact lens being characterized in that: a positive additional power as compared to a power in the central region is set in a peripheral region of the optical part to correct a hyperopic focal error in order to suppress progression of myopia and myopic astigmatism beyond the refractive correction power set in the central region; a positioning member that specifies a circumferential position of the lens under a worn condition is provided; and a lens optical axis of the optical part is set offset from a lens geometric center to align with a line of sight of a human eye under the worn condition produced by the positioning member.

First, in the course of completing the present invention, the inventor examined contact lenses for myopia progression suppression with a conventional structure, and as a result, the inventor acquired knowledge that the main cause of the conventional problem that the requirement of setting a larger value of additional power described above reduces the value of QOV or the like lies in the deviation between the line of sight under a worn condition of a contact lens for myopia progression suppression and the lens optical axis. That is, in an emmetropic eye, the focus can be placed on the retina either in its central or peripheral region as shown in FIG. 9A, but in a myopic eye, wearing a monofocal lens adjusted to focus on the retina in the central region brings the focus behind the retina in the retinal peripheral region to generate hyperopic blur, as shown in FIG. 9B. For that reason, in the contact lens for myopic progression suppression with a conventional structure, a positive diopter region of additional power is provided to set the focus in the retinal peripheral region on or before the retina. However, according to the inventor's examination, the stable position of the contact lens for myopia progression suppression on the cornea or conjunctiva tends to be offset due to the curvature distribution of the cornea and the like, resulting in the deviation between the line of sight and the lens optical axis as shown in FIG. 10. This deviation causes the focus to be displaced behind the retina on the front side in the shifting direction (to the right in FIG. 10). Therefore, in order to obtain a desired effect of myopia progression suppression by setting the focus on or before the retina all across the retinal peripheral region, a lens that gives the focus 'a' shown in FIG. 10 is not enough, but another lens that gives the focus 'b' in the same Figure is required. Meanwhile, the lens that gives such focus 'b' focuses too much in front of the retina in the back side in the shifting direction (to the left in FIG. 10). As a result, partially excessive additional power ends up being set, so that the inventor acquired knowledge that QOV is likely to decrease due to generation of asymmetrical high-order aberration such as coma aberration caused by uneven distribution of myopic focal error in the retinal peripheral region. Also, the problem caused by the deviation between the line of the sight of the eye wearing such lens and the lens optical axis still remains even if multiple foci are set on the optical axis by setting power variation from the optical axis of the optical part toward the outer periphery thereof.

According to the present invention made based on the novel knowledge obtained about the contact lens for myopia progression suppression of such conventional art, the lens optical axis of the optical part is set offset to align with the line of sight of the human eye. Therefore, the amount of positional deviation of a line of sight 16 of a human eye 14 from a lens optical axis 18 of the lens can be reduced even if the stable position on a cornea 12 of the contact lens 10 having a myopia progression suppression capability is shifted toward the ear or the like, as shown in FIG. 1, thus suitably enabling to align the line of sight 16 and the lens optical axis 18.

Therefore, there is no need any more to set the focus on or before the retina all across the retinal peripheral region, nor any need to excessively heighten the added lens power required for setting an additional focus on the cornea side of the focus on the lens optical axis where myopic correction is properly performed, thus enabling to set the focus evenly in the retinal peripheral region at a position closer to the retina, or to set a lens power properly adjusted for myopia and an additional focus at a proper value of additional power on the lens optical axis. That is, in the contact lens 10 having a myopia progression suppression capability with the structure according to the present invention, the focus can be set on or before the retina all across the retinal peripheral region, as shown by the focus 'A' of FIG. 1, even if the same additional power that gives the focus 'a' in FIG. 10 is set, which was considered insufficient for obtaining the effect of myopia progression suppression using a contact lens for myopia progression suppression of the conventional art. Also, even when multiple or progressively growing foci are set on the lens optical axis, an image seen on the line of sight after a proper vision correction can be perceived in a stable manner due to the proper lens power for myopic correction on the lens optical axis, which enables to avoid any adverse effect of additional power set on the outer periphery of the lens, thus making it unnecessary to set an excessive lens power within the optical domain where each focus is formed on the optical axis.

Therefore, in the contact lens having a myopia progression suppression capability with the structure according to the present invention, the lens optical axis of the optical part can be aligned with the line of sight taking into account the aberration of the focal position resulting from additional lens power relative to the retina, whereby the effect of myopia progression suppression equivalent to that of the contact lens for myopia progression suppression with a conventional structure can be enjoyed while the proper lens power for myopic correction and/or the additional power can be set low enough.

In addition, the deviation of the focal position from the retina can be nearly equalized at a small amount all across the retinal peripheral region. This allows, for example, asymmetrical high-order aberration such as coma aberration to be restricted from increasing so that QOV (Quality of Vision) is maintained at a good level under a worn condition of the lens, thus enabling to obtain an intended effect of myopia progression suppression while substantially reducing the burden on the lens wearer.

A second aspect of the present invention provides the contact lens having the myopia progression suppression capability according to the first aspect, wherein a maximum value of the additional power set in the peripheral region of the optical part is in a range from +0.25 to less than +1.00 diopter.

In the contact lens having the myopia progression suppression capability of the present aspect, a substantially smaller value of additional power can be adopted as compared to the conventional art wherein additional power of around +2.0 diopters is generally set within a range of achieving a good effect of myopia progression suppression, which makes it possible to favorably maintain the QOV under a worn condition of the lens at the same level as a regular contact lens for refractive correction.

A third aspect of the present invention provides the contact lens having the myopia progression suppression capability according to the first or second aspect, wherein a positive spherical aberration is given to the optical part due to the additional power set in the peripheral region of the optical part while the lens optical axis of the optical part is set offset from a lens geometric center to align with the line of sight of the human eye under the worn condition due to the positioning member as well as an offset structure of the lens optical axis of the optical part so that a depth of focus increases without causing any reduction of subjective QOV associated with an increase in asymmetrical high-order aberration such as coma aberration.

In the contact lens having the myopia progression suppression capability of the present aspect, deviation between the lens optical axis of the optical part and the line of sight is restricted by the offset structure of the lens optical axis under a worn condition of the lens. This allows the asymmetrical high-order aberration such as coma aberration to be restricted, which makes it possible to take advantage only of optical properties including a positive spherical aberration due to setting a positive additional power as a depth of focus. As a result, a large depth of focus can be effectively used to reduce the accommodation lag to obtain decent QOV even with some disparity of foci in the retinal peripheral region, for example, while further improvements can be made to the corrective effect of hyperopic focal error taking advantage of the magnitude of the depth of focus around the fovea and peripheral region of the retina.

A fourth aspect of the present invention provides the contact lens having the myopia progression suppression capability according to any of the first to third aspects, wherein the additional power in the peripheral region of the optical part is set to change gradually without steps from a center side of the optical part toward an outer peripheral side thereof so as to increase an amount of correction of the focal error.

In the contact lens having the myopia progression suppression capability of the present aspect, the positive additional power set to change continuously from the center side of the optical part toward the outer peripheral side makes it possible to align the focus with the retinal position of the human eye in a higher precision.

A fifth aspect of the present invention provides the contact lens having the myopia progression suppression capability according to the fourth aspect, wherein the additional power in the peripheral region of the optical part is set to change gradually without steps from the center side of the optical part toward the outer peripheral side thereof so as to increase the amount of correction of the focal error, and in an outermost periphery of the peripheral region of the optical part, a region of maximum and constant additional power is provided in an annular shape with a prescribed width.

In the contact lens having the myopia progression suppression capability of the present aspect, the correction region in an annular shape with the maximum value of additional power provided in the outermost periphery of the optical part enables tuning of the lens such as improving the visibility of objects within a specific distance range, thus enhancing the degree of freedom in setting optical properties.

A sixth aspect of the present invention provides the contact lens having the myopia progression suppression capability according to any of the first to third aspects, wherein the additional power in the peripheral region of the optical part is set to change in steps from a center side of the optical part toward an outer peripheral side thereof so as to increase an amount of correction of the focal error.

In the contact lens having the myopia progression suppression capability of the present aspect, a specific value of additional power is set in each of the correction regions formed in concentric rings in the peripheral region of the optical part, which makes it easy to design and measure the optical properties or the like. Also, by means of adjusting the value of additional power for each of the multiple correction regions formed in concentric rings as well as each width in the radial direction, the area or the like, significant degree of freedom in setting optical properties can be secured.

A seventh aspect of the present invention provides the contact lens having the myopia progression suppression capability according to any of the first to sixth aspects, wherein an optical surface that gives the additional power in the peripheral region of the optical part is set on at least one of lens front and back surfaces.

In the contact lens having the myopia progression suppression capability related to the present aspect, the optical surface to set an additional power is not limited to the front or back of the lens but can be selectively set in front or back of the lens considering the required optical properties and each dimension, and the manufacturing method or the like to be adopted. For example, by setting a value of additional power on the lens front surface, the lens back surface can be made in a shape of a curved surface equivalent to that of the cornea, and by setting a value of additional power on the lens back surface, the number of mold types can be reduced for the lens front surface to make lens manufacturing easier. Also, it is possible to dispersedly set values of additional power on the lens front and back surfaces, and the variation of shapes on the lens front and back surfaces can be minimized even if the value of additional power is high.

An eighth aspect of the present invention provides the contact lens having the myopia progression suppression capability according to any of the first to seventh aspects, wherein an optical surface that gives a cylindrical lens power for astigmatism correction is set on at least one of the lens front and back surfaces of the optical part.

In the contact lens having the myopia progression suppression capability of the present aspect, wearing the lens on an astigmatic eye demonstrates the effect of astigmatism correction, thus allowing further improvements to the QOV in a worn condition of the lens.

A ninth aspect of the present invention provides the contact lens having the myopia progression suppression capability according to any of the first to eighth aspects, wherein the refractive correction power is set in the central region that gives a proper vision in a central portion of a retina on the lens optical axis, while the additional power is set in the peripheral region that gives a focus around the retina.

In the contact lens having the myopia progression suppression capability of the present aspect, there is no need any more to set the additional power required for setting the focus around the retina at an excessively high level. Especially, by actively deviating the optical central axis of the contact lens, the contact lens is allowed to be worn with its geometrical center shifted from the axis of the lens-wearing eye under a condition where the lens optical axis with the proper lens power set for refractive correction is aligned with the line-of-sight axis of the eye, which allows a stable wearing condition of the contact lens without any discomfort, thus achieving both good QOV and the effect of myopia progression suppression in cooperation with the positioning member in the circumference direction.

A tenth aspect of the present invention provides the contact lens having the myopia progression suppression capability according to any of the first to eighth aspects, wherein the central region includes a proper vision correction region where a proper vision correction power of substantially constant value is set to give a proper vision on the lens optical axis of the optical part for far vision, and the peripheral region includes an accommodative insufficiency compensation region where an accommodative insufficiency compensation power of substantially constant value is set as the additional power to compensate lack of accommodation on the lens optical axis of the optical part for near vision.

In the contact lens having the myopia progression suppression capability of the present aspect, there is no need any more to set the additional power too high that is required for setting an additional focus on the cornea side of the focus where a proper condition for near-sight correction is set up on the lens optical axis. Especially, by actively deviating the optical central axis of the contact lens, the contact lens is allowed to be worn with its geometrical center shifted from the axis of the lens-wearing eye under a condition where the lens optical axis with the proper lens power set for refractive correction is aligned with the line-of-sight axis of the eye, which allows a stable wearing condition of the contact lens without any discomfort, thus achieving both good QOV and the effect of myopia progression suppression in cooperation with the positioning member in the circumference direction.

An eleventh aspect of the present invention provide the contact lens having the myopia progression suppression capability according to the tenth aspect, wherein the accommodative insufficiency compensation power is set in a range from +0.5 to +0.75 diopter relative to the proper vision correction power.

In the contact lens having the myopia progression suppression capability of the present aspect, the accommodative insufficiency compensation power more suitable for obtaining a strong myopia progression suppression effect can be set under a condition where the lens optical axis is aligned with the line-of-sight axis in high precision, while maintaining a good level of QOV. Especially, by adopting an accommodative insufficiency compensation power in a range from +0.5 to +0.75 diopter, the accommodation lag caused by accommodative insufficiency of the eye according to the accommodation lag theory can be compensated effectively in near vision at about 40 cm from the eye, which occurs in our daily life in high frequency.

A twelfth aspect of the present invention provides the contact lens having the myopia progression suppression capability according to the tenth or eleventh aspect, wherein the proper vision correction region is set with a diameter of more than 0 mm and less than 5 mm around the lens optical axis of the optical part.

In the contact lens having the myopia progression suppression capability of the present aspect, the proper vision correction region can be effectively secured within a range of less than 5 mm in diameter around the center of the contact lens of the present invention having the optical axis approximately aligned with the line-of-sight axis, considering the characteristics of human eyesight that the photostimulation on the fovea located at the center of the retina is predominant. Given the average pupil diameter of human eyes, there is a risk that, when the proper vision correction region exceeds 5 mm in diameter, it is difficult for the accommodative insufficiency compensation region provided in the outer periphery to function in a stable manner under a worn condition of the lens.

A thirteenth aspect of the present invention provides the contact lens having the myopia progression suppression according to any of the tenth to twelfth aspects, wherein the accommodative insufficiency compensation region is set in a region of not less than 2 mm in diameter around the lens optical axis of the optical part in an annular shape with a prescribed width.

In the contact lens having the myopia progression suppression capability of the present aspect, considering a situation of near vision such as reading a book indoors and given the average pupil diameter of the human eye, a myopia progression suppression capability due to compensating the accommodative insufficiency in the situation of near vision can be favorably exerted by means of providing an accommodative insufficiency compensation region in a range of 2 mm or more in diameter without substantially impeding the vision within the proper vision correction region for far vision.

A fourteenth aspect of the present invention provides a contact lens set having a myopia progression suppression capability that combines contact lenses with multiple types of optical properties each of which is the contact lens having the myopia progression suppression capability according to any of the first to thirteenth aspects, and in which mutually different values are set to the contact lenses as the refractive correction power in the central region of the optical part, the contact lens set being characterized in that the higher a negative diopter value of the refractive correction power in the central region of the optical part is set, the higher the positive additional power is set in the peripheral region of the optical part.

In the contact lens set having the myopia progression suppression capability of the present aspect, considering the flattening tendency of myopic eyeballs that advances due to the extended ocular axis as myopia progresses, the higher the negative diopter value of the refractive correction power that corrects myopia and myopic astigmatism in the central region of the optical part, that is, the more advanced the myopia and myopic astigmatism are, the higher the value of additional power of the contact lens is to be prepared with the myopia progression suppression capability in the peripheral region of the optical part. Therefore, it becomes possible to effectively offer contact lenses having a myopia progression suppression capability at an additional power according to the degree of progression of myopia or myopic astigmatism in each patient.

In the contact lens set having the myopic progression suppression capability of the present aspect, in accordance with the diopter value of the refractive correction power in the central region of the optical part, the positive additional power in the peripheral region of the optical part is not prepared with a single specific diopter value but can be prepared in combination of multiple types of additional power. In that case, as the diopter value of refractive correction power gets high on the negative side in the central region of the optical part, for example, contact lenses having multiple types of myopia progression suppression capabilities are combined so as to increase on the positive side the maximum or average value of additional power set in the peripheral region of the optical part.

A fifteenth aspect of the present invention provides the contact lens set having the myopia progression suppression capability according to the fourteenth aspect comprising the contact lenses with multiple types of optical properties, wherein each refractive correction power in the central region of the optical part is set in a range from −0.25 to −10 diopters, and an upper limit of the additional power in the peripheral region of the optical part is set in a range from +0.25 to less than +1.00 diopter.

In the contact lens set having the myopia progression suppression capability of the present aspect, the one having lens power substantially low to the extent of being able to obtain a favorable effect of myopia progression suppression is selected for application to each patient as opposed to those of the conventional art for myopia progression suppression where a high additional power at around +2.0 diopters is generally set, thus enabling to secure good QOV in a worn condition of the contact lens having a myopia progression suppression capability in the procedure of such suppression.

A sixteenth aspect of the present invention provides a contact lens set having a myopia progression suppression capability that combines contact lenses with multiple types of optical properties each of which is the contact lens having the myopia progression suppression capability according to any of the tenth to thirteenth aspects, and in which mutually different values are set to the contact lenses as the proper vision correction power in the proper vision correction region of the optical part, the contact lens set being characterized in that the accommodative insufficiency compensation power in the accommodative insufficiency compensation region is set at a constant value in a range from +0.5 to +0.75 diopter relative to the proper vision correction power without regard to a value thereof in the proper vision correction region.

In the contact lens set having the myopia progression suppression capability of the present aspect, the accommodative insufficiency compensation power is prepared with a single specific value in the peripheral region of the optical part without regard to the diopter value of the proper vision correction power in the central region of the optical part. That is, using the contact lens related to the present invention, the lens optical axis in a worn condition is aligned with the line-of-sight axis of the eye, so that a proper condition of vision correction is achieved in a stable manner in far vision, and as a result, the accommodative insufficiency compensation power that can effectively compensate the accommodation lag in near vision assumingly at about 40 cm from the eye can be advantageously set at a constant value in a range from +0.5 to +0.75 diopter.

Also, in this way, without regard to various diopter values of proper vision correction power set according to the degree of myopia etc. of the human eye, the accommodative insufficiency compensation power in the peripheral region of the optical part can be prepared with a single specific value, which not only makes the design of the contact lens set easier but also facilitates the adaptive procedure for each individual, while making it possible to obtain the intended myopia progression suppression capability in a stable manner.

Effect of the Invention

According to the contact lens or contact lens set having the myopia progression suppression capability of the present invention, reducing the amount of deviation between the line of sight of the human eye and the lens optical axis under a worn condition of the lens makes it possible to evenly set foci in the retinal peripheral region near the retina or to set an additional focus with a proper lens power for myopic correction and a proper value of additional power on the lens optical axis. Therefore, the intended effect of myopia progression suppression can be obtained while maintaining good QOV under a worn condition of the lens and reducing the burden of the wearer.

BRIEF DESCRIPTION OF THE DRAWINGS

FIG. 8 is a view suitable for explaining an effect of increased depth of focus owing to the additional power set in the optical part of the contact lens shown in FIG. 6, wherein Comparative Example 1 explains a contact lens for myopia progression suppression with a conventional structure while Example 1 explains the contact lens having the myopia progression suppression capability of the present embodiment.

FIGS. 9A and 9B are longitudinal cross sectional views suitable for explaining the off-axis aberration theory as the background art, wherein FIG. 9A explains a focal position in an emmetropic eye, and FIG. 9B explains a focal position in a myopic eye corrected by a monofocal lens.

FIG. 10 is a view suitable for explaining a focal position under a worn condition of the contact lens for myopia progression suppression with the conventional structure on a human eye.

EMBODIMENTS FOR CARRYING OUT THE INVENTION

In order to further clarify the specifics of the present invention, embodiments thereof will be described in detail below in reference to the drawings.

Figure 1:
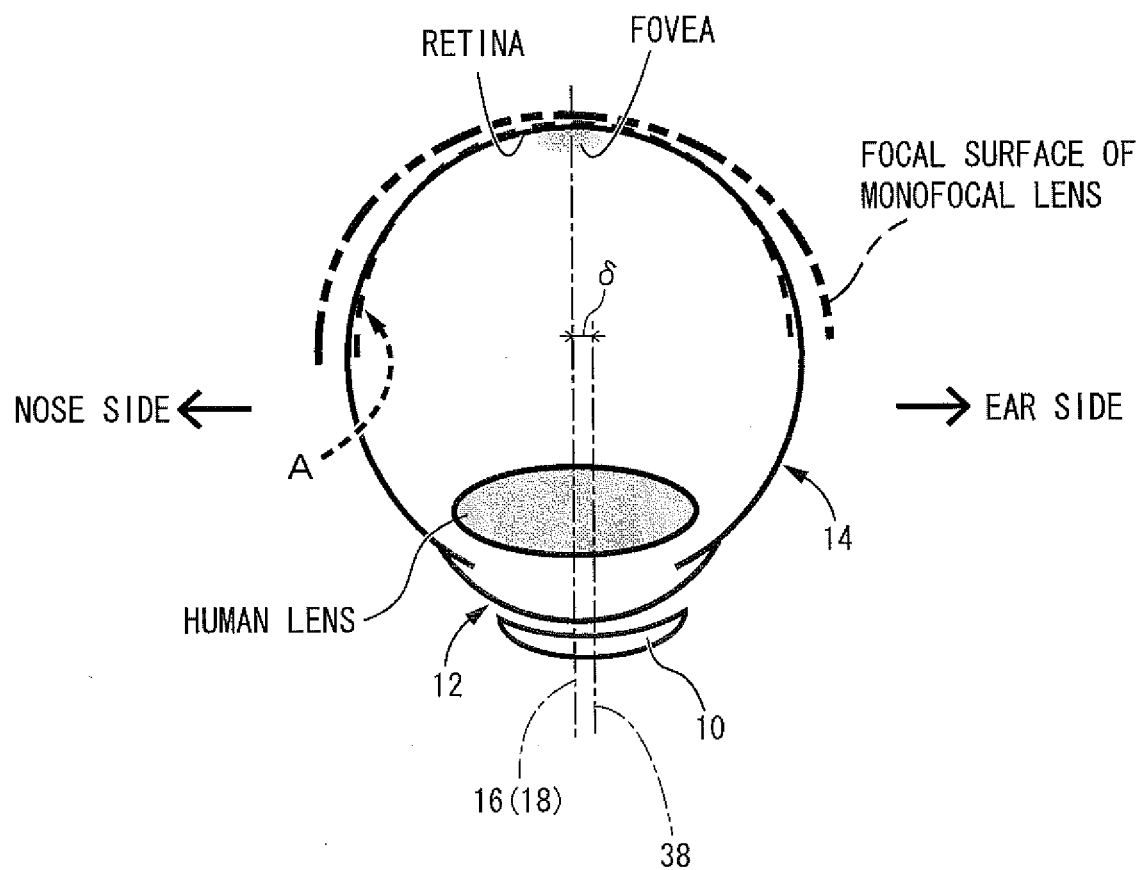
FIG. 1 is a view suitable for explaining a worn condition of a contact lens having a myopia progression suppression capability according to the present invention on a human eye.
Figure 2:
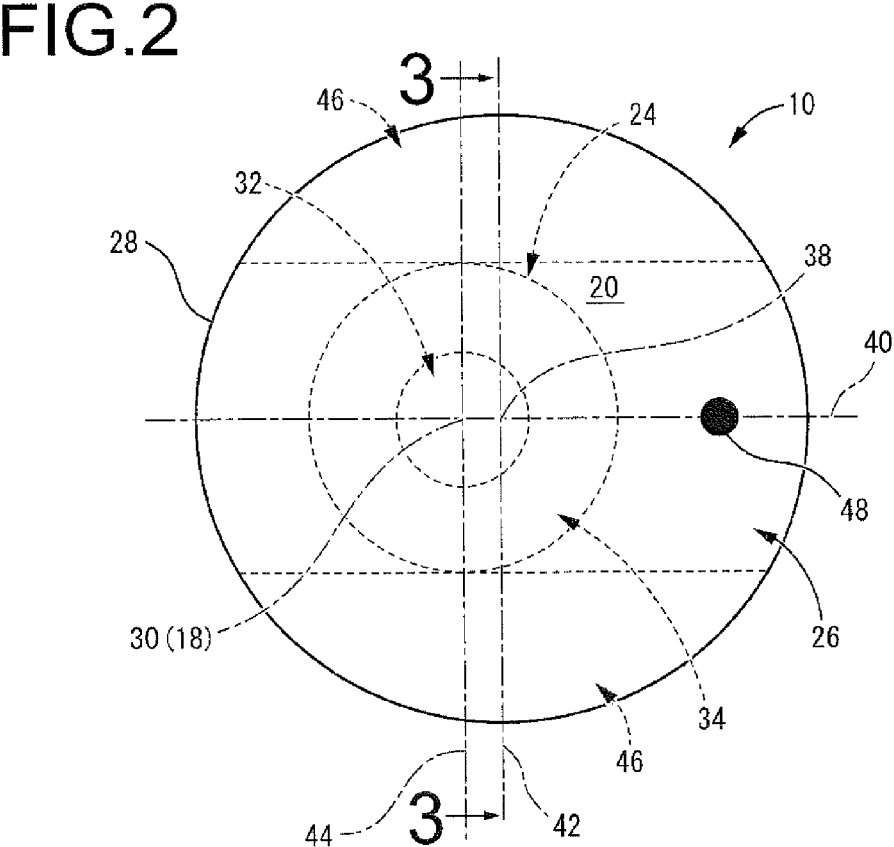
FIG. 2 is a front view of a contact lens as a first embodiment of the present invention.
Figure 3:
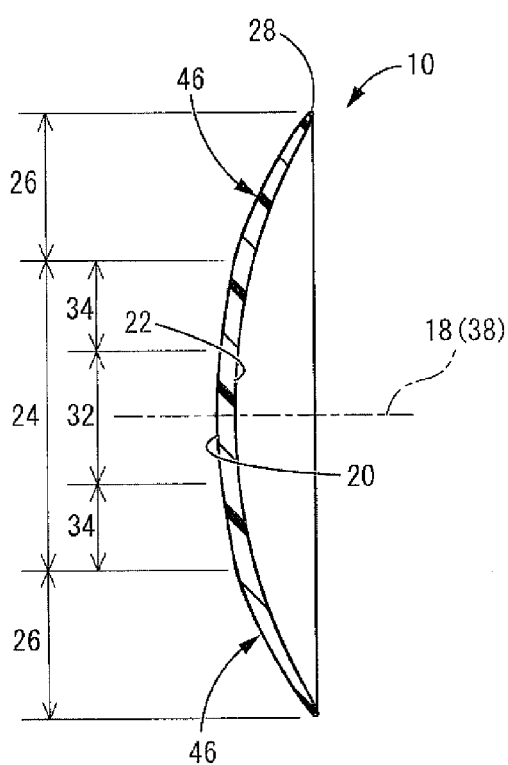
FIG. 3 is a cross sectional view taken along line 3-3 of FIG. 2.

First, FIG. 2 shows a front view of a contact lens 10 as a first embodiment of the present invention having a myopia progression suppression capability that suppresses the progress of myopia and myopic astigmatism, while FIG. 3 shows a longitudinal cross section of such contact lens 10. The contact lens 10 in an approximate shape of a spherical crown as a whole, as shown in FIG. 1 that diagrammatically illustrates a worn condition thereof, is worn to be used by overlapping it on the surface of a cornea 12 of a human eye 14. In the following descriptions, the human eye 14 and the contact lens 10 in FIGS. 1, 2 and 8 are all left eyes and lenses for left eyes, and the left and right sides are indicated as the nose-side and ear-side, respectively.

The contact lens 10 having such function of myopia progression suppression can either be a soft type or a hard type. Its material is not limited to any particular one, and a soft type contact lens having a myopia progression suppression capability, for example, can adopt a non-hydrated material etc. such as acrylic rubber and silicone other than the publicly known hydrated material such as PHEMA (polyhydroxyethyl methacrylate) and PVP (polyvinyl pyrrolidone). Also, it is possible to make a hard type contact lens having a myopic progression suppression capability using a material for a rigid gas permeable (RGP) lens etc. such as PMMA (polymethyl methacrylate) and SiMA/MMA polymer.

More in detail, the contact lens 10 of the present embodiment having a myopia progression suppression capability is made in a circular shape in front view, as shown in FIG. 2, with a lens front surface 20 in an approximate shape of a convex spherical crown and a lens back surface 22 in an approximate shape of a concave spherical crown as shown in FIGS. 2 and 3.

Also, such contact lens 10 is structurally composed of an optical part 24 extending in a near circular shape at the center in front view, a peripheral part 26 extending in an approximately annular shape surrounding the optical part 24 in front view, and an edge portion 28 located in the outmost periphery of the lens around the peripheral part 26 connecting the lens front and back surfaces.

The optical part 24 is an optical region located on the optical path where light incident through the wearer's pupil is projected to the retina, providing the incident light to the human eye 14 with a prescribed refractive power. That is, the optical part 24 is formed in a size large enough to cover the wearer's pupil, and is generally desirable to be formed with the outer diameter of 5 to 8 mm considering the diameter of expanded pupil of the eye. Then, in the optical part 24, a refractive correction power and an additional power for myopia progression suppression are set to correct myopia and myopic astigmatism according to the optical properties of the wearer's ocular optical system.

In other words, in such optical part 24, the refractive correction power that corrects myopia and myopic astigmatism is set in a central region 32 containing an optical axis center 30. If the wearer has myopia that does not require astigmatism correction, for example, a lens power of negative diopter for myopic correction corresponding to the degree of myopia is set in the central region 32 of the optical part 24 as a spherical lens power so as to eliminate myopic blur seen by a naked eye. In the present embodiment, a proper vision is given for far vision in the central portion of the retina on a lens optical axis 18 by means of setting such refractive correction power in the central region 32.

Also, in a peripheral region 34 in an annular shape located on the outer peripheral side of the central region 32 of the optical part 24, an additional power is set for myopia progression suppression. This additional power is to be set such that the focus in the retinal peripheral region is located on the retina or before the retina close thereto considering the configuration of the retinal peripheral region affected by the extension of the ocular axis of the wearer's eye and the like. Since an eye to be treated for myopia progression suppression generally takes an approximate shape of a flattened egg with the retinal peripheral region extending in the direction of ocular axis, any additional power in such peripheral region 34 has a positive value of diopter relative to the power in the central region 32 in order to correct the hyperopic focal error, and is more preferably set at various values increasing from the center side of the optical part 24 toward the outer peripheral side. In the present embodiment, by setting such additional power in the peripheral region 34, the focus is formed near the retina, that is, at a location on the side of the cornea 12 rather than in the retinal peripheral region, which is outside of the lens optical axis 18. The maximum value of such additional power is preferably set in a range from +0.25 to less than +1.00 diopter.

Figure 4:
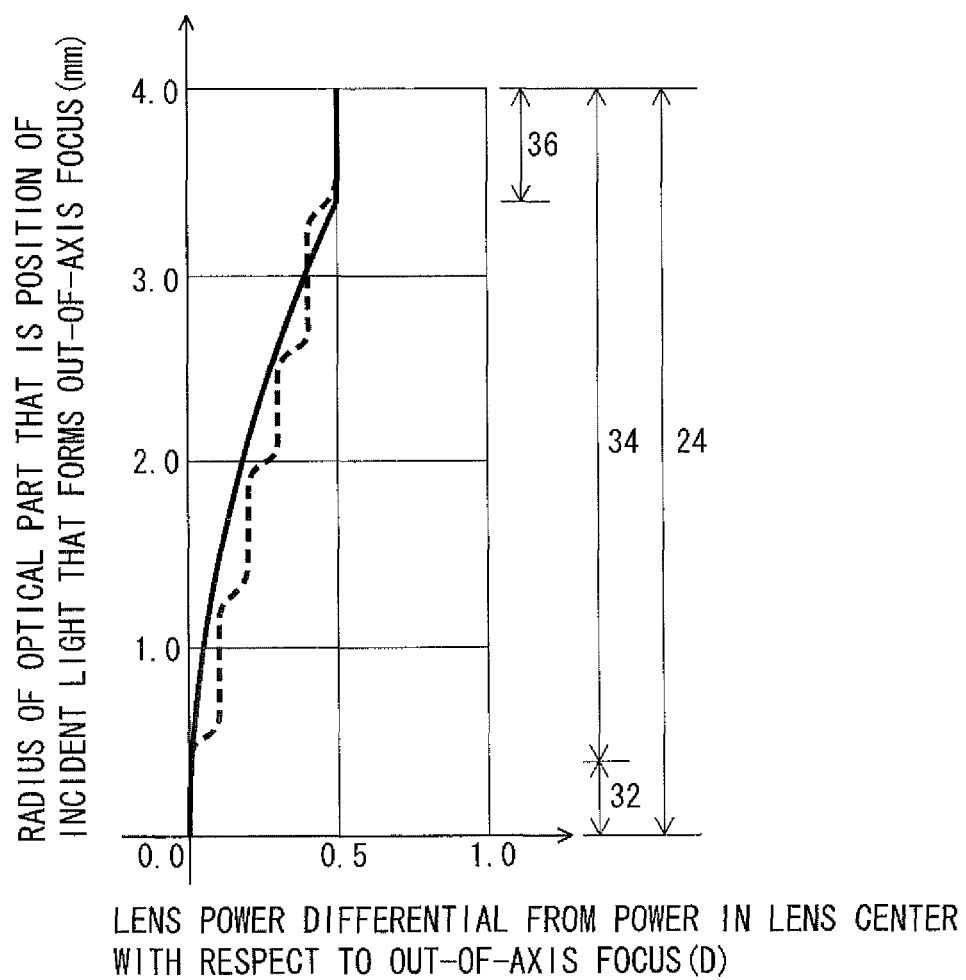
FIG. 4 is a graph for explaining an additional power set in an optical part of the contact lens as the first embodiment shown in FIG. 2, showing examples of changing without steps (solid line) and changing in steps (dashed line).

More specifically, for example, as indicated by the solid line in FIG. 4, the additional power is set to change continuously and gradually without steps from the optical axis center 30, which is the center of the optical part 24, toward the peripheral region 34 on the outer peripheral side in the radial direction. This provides the optical part 24 with a positive spherical aberration. As a result, the amount of correction of focal error is made to increase toward the front as it goes to the outer peripheral side as compared to a focal position of a monofocal lens with no additional power, thus enabling to align the focus accurately with the position of the retina that changes continuously in a non-spherical manner from the center toward the outer peripheral side.

In the central region 32 of the optical part 24 where a refractive correction power is set, any outer diameter can be set depending on the wearer's tastes and living environment and the degree of additional power and the like. For example, the central region 32 with no additional power can be formed only on the optical axis center 30 by setting an additional power gradually increasing toward the outer peripheral side starting from the optical axis center 30 of the optical part 24.

Also, as shown in FIG. 4, a maximum additional power portion 36 can be provided in an annular shape with the maximum and constant value of additional power extending in the radial direction with a prescribed width in the outermost periphery of the peripheral region 34 of the optical part 24. By means of providing such maximum additional power region with a prescribed area, tuning such as improving the visibility of objects within a specific distance range, for example, is made possible. The maximum additional power portion 36 in an annular shape is preferably formed within a region of 2 mm or more in diameter, whereby the effect of correcting the focal error in the central region 32 described above can be well maintained.

As evident from the descriptions above, the vertical axis in FIG. 4, namely the 'radius of the optical part' indicates a position of the incident light that forms a focus at a position on the retina away from the center thereof. Since such ray of light is generally inclined against the optical axis, the 'lens power differential' of the horizontal axis in FIG. 4 is expressed as a difference of lens power of the inclined ray of light relative to the lens power of the ray of light on the lens center axis.

Also, the aspect of setting the additional power in the peripheral region 34 is not limited to the continuous change without steps from the center toward the outer periphery as described above. For example, as indicated by the dash line in FIG. 4, the aspect of setting the additional power to increase from the center side toward the outer peripheral side in steps is adoptable. In setting the additional power changing in steps, a transitional region can be provided between adjacent additional powers to smooth them out. Setting the additional power in steps this way can result in the same effect as setting it without steps.

In addition, in case the optical properties of the wearer's ocular optical system include astigmatism, a cylindrical lens power required to correct such astigmatism can be set in the optical part 24 comprising the central region 32 where the spherical lens power described above is set and the peripheral region 34 where the additional power is set. That is, the cylindrical lens power required to correct the wearer's astigmatism is set in the optical part 24 with a prescribed angle of cylindrical axis.

In the optical part 24, the optical surface creating the spherical, additional or cylindrical lens power described above can be set in either the lens front surface 20 or the lens back surface 22, which can also be set so as to demonstrate prescribed optical properties in cooperation between the lens powers on the lens front surface 20 and the lens back surface 22.

Introducing a specific example, one of the lens front surface 20 and lens back surface 22 in the optical part 24 is made in a spherical shape with the curvature radius that takes into account the corneal radius and the like, while the other surface is made in a spherical shape having a curvature radius that gives the required spherical lens power. In addition, non-spherical configuration that gives additional power is added to at least one of the lens front and back surfaces 20, 22, while a toric surface having a particular axis in the radial direction is also added as needed. Then, by having the lens front surface 20 and the lens back surface 22 formed on the same optical axis center 30, the optical part 24 provided with the optical properties described above can be realized.

Meanwhile, the peripheral part 26 formed around the optical part 24 is composed of the lens front and back surfaces 20, 22 that are smoothly connected from the optical part 24, and is made as a region that does not affect the optical properties of the ocular optical system. Also, such peripheral part 26 has the width dimension in the radial direction continuously changing between the narrow portion to the left and the wide portion to the right in FIG. 2.

That is, the outer shape of the lens is determined by the edge portion 28 located in the outer peripheral edge of the peripheral part 26, but the contact lens 10 of the present embodiment having a myopia progression suppression capability has a circular outer shape around a lens geometric center 38, which is the center of the lens outer shape. Meanwhile, the optical axis center 30 of the optical part 24 is offset from the lens geometric center 38 by a prescribed value of eccentricity δ (δ≠0). The outer shape of the optical part 24 does not have to be geometrically centered around the optical axis center 30, but in the present embodiment, the optical part 24 is provided with its outer shape in a near circular shape around the optical axis center 30.

In addition, the peripheral part 26 is provided with a positioning member that determines a position of the contact lens 10 in the circumference direction under a worn condition, whereby the direction of eccentricity of the optical axis center 30 of the optical part 24 relative to the lens geometric center 38 becomes nearly horizontal under the worn condition. That is, an eccentric direction line 40 of the optical part 24 shown in FIG. 2 becomes nearly horizontal so that the contact lens 10 of the present embodiment having a myopia progression suppression capability is positioned under a worn condition in such a way that perpendicular direction lines 42, 44 extending perpendicular to the eccentric direction line 40 through the lens geometric center 38 and the optical axis center 30 become nearly vertical.

Under these circumstances, various structures that have been publicly known are adoptable as a positioning member. Introducing some specific examples, the "truncation method" disclosed in Japanese Unexamined Utility Model Publication No. JP-U-48-013048 etc., the "prism ballast method" disclosed in Japanese Unexamined Patent Publication No. JP-A-11-258553 etc., and the "slab-off method (double thin method)" disclosed in Japanese Unexamined Patent Publication No. JP-A-8-304745 etc. are widely known, and the "peri-ballast method" disclosed in U.S. Pat. No. 5,100,225 etc. and others are also adoptable. That is, the "truncation method" allows positioning of a contact lens in the circumference direction by supporting the lowest periphery of the lens by the lower eyelid in a linear form in the chord direction. The "prism ballast method" allows positioning of a contact lens in the circumference direction using the gravitational action by setting a prism all across the lens and making it thicker downward. The "slab-off method" allows positioning of a contact lens in the circumference direction by providing thinner portions toward the top and bottom thereof and using tight holding actions of the eyelids against the top and bottom portions of the lens and eyelid pressures against the inclined faces of the top and bottom portions of the lens. The "peri-ballast method" allows positioning of a contact lens in the circumference direction by forming a pair of thicker portions at positions offset downward on the right and left sides in the peripheral portion of the lens and using gravitational balance by the pair of thicker portions.

Especially, FIG. 2 illustrates an example where a positioning member is adopted using the slab-off method to determine the position in the circumference direction of the contact lens 10 having a myopia progression suppression capability. That is, a pair of upper and lower slab-off regions 46, 46 are formed in the peripheral part 26 to gradually thin out from the center toward the top and bottom thereof on the upper and lower sides of the optical part 24 across the eccentric direction line 40 extending in the horizontal direction. The face of the thinner portions that provides the slab-off regions 46, 46 can be formed on either or both sides of the lens front and back surfaces 20, 22, and in the present embodiment, it is formed only on the lens front surface 20 as shown in FIGS. 2 and 3.

Especially in the present embodiment, the pair of upper and lower slab-off regions 46, 46 are formed in linear symmetry about the eccentric direction line 40. This allows the contact lens 10 to have the eccentric direction line 40 nearly horizontal under a condition of being worn on the human eye 14 to be positioned on the cornea 12 with the perpendicular direction lines 42, 44 nearly vertical.

Also in the present embodiment, a mark 48 is provided making the circumferential position of the lens visually perceptible in the peripheral part 26. The mark 48 is formed, for example, by a perceptible configuration such as engraving or coloration provided in the peripheral part 26, and can even be composed of letters and signs. By specifying the position of the mark 48 in advance along the circumference of the peripheral part 26 or the like, the eccentric direction of the optical axis center 30 relative to the lens geometric center 38 can be identified based on the mark 48.

For example, by placing the mark 48 on either side across the optical part 24 on the eccentric direction line 40, or by placing the mark 48 on either side across the optical part 24 on the perpendicular direction line 42, the eccentric direction of the optical axis center 30 can be identified based on the position of such mark 48. By the way, in the present embodiment shown in FIG. 2, the mark 48 in a colored circular shape is provided at a location opposite the eccentricity side of the optical axis center 30 on the eccentric direction line 40.

The contact lens 10 having a myopia progression suppression capability with the structure described above can be formed by directly machining a block made in advance by polymerization molding with proper materials, but for realization of high mass productivity and excellent stability of product quality, it is desirable to manufacture the lens by mold forming. Detailed descriptions are omitted here because both manufacturing methods are implementable using publicly known techniques, but it is possible, for example, to manufacture the contact lens 10 having a myopic progression suppression function provided with the intended lens front and back surfaces 20, 22 by means of polymerization molding of a given monomer for polymerization within a semi-tight molding cavity created between the molding surfaces of a male mold and a female mold, the female mold having a mold surface in an approximate shape of a concave spherical crown corresponding to the lens front surface 20 and the male mold having a mold surface in an approximate shape of a convex spherical crown corresponding to the lens back surface 22, which are matched with each other.

The contact lens 10 having a myopia progression suppression capability with the structure described above is worn in a state of being overlapped on the surface of the cornea 12 of the human eye 14, as shown in FIG. 1. Under such wearing condition, the contact lens is positioned in the circumference direction by a positioning member composed of slab-off regions 46, 46 provided in the peripheral part 26 to make the eccentric direction of the optical axis center 30 relative to the lens geometric center 38 horizontal. Then, the contact lens 10 under such worn condition is positioned in the left-right direction so as to make the eccentric direction of the optical axis center 30 toward the nose, or facial center, of the wearer. By using the mark 48 as a marker, this left-right positioning is implementable by setting the mark 48 on the ear side, or outer side of the wearer's face. Also, once the positioning in the circumference direction is done, the position of the lens in the circumference direction is maintained by the positioning member.

Thus, the contact lens 10 having a myopia progression suppression capability worn this way is made in a condition where the optical axis center 30 is offset by the value of eccentricity δ relative to the lens geometric center 38 toward the nose, and as a result of this eccentricity, the amount of positional deviation of the lens optical axis 18 (optical axis center 30) from the wearer's line of sight 16 is effectively restricted.

Figure 5:
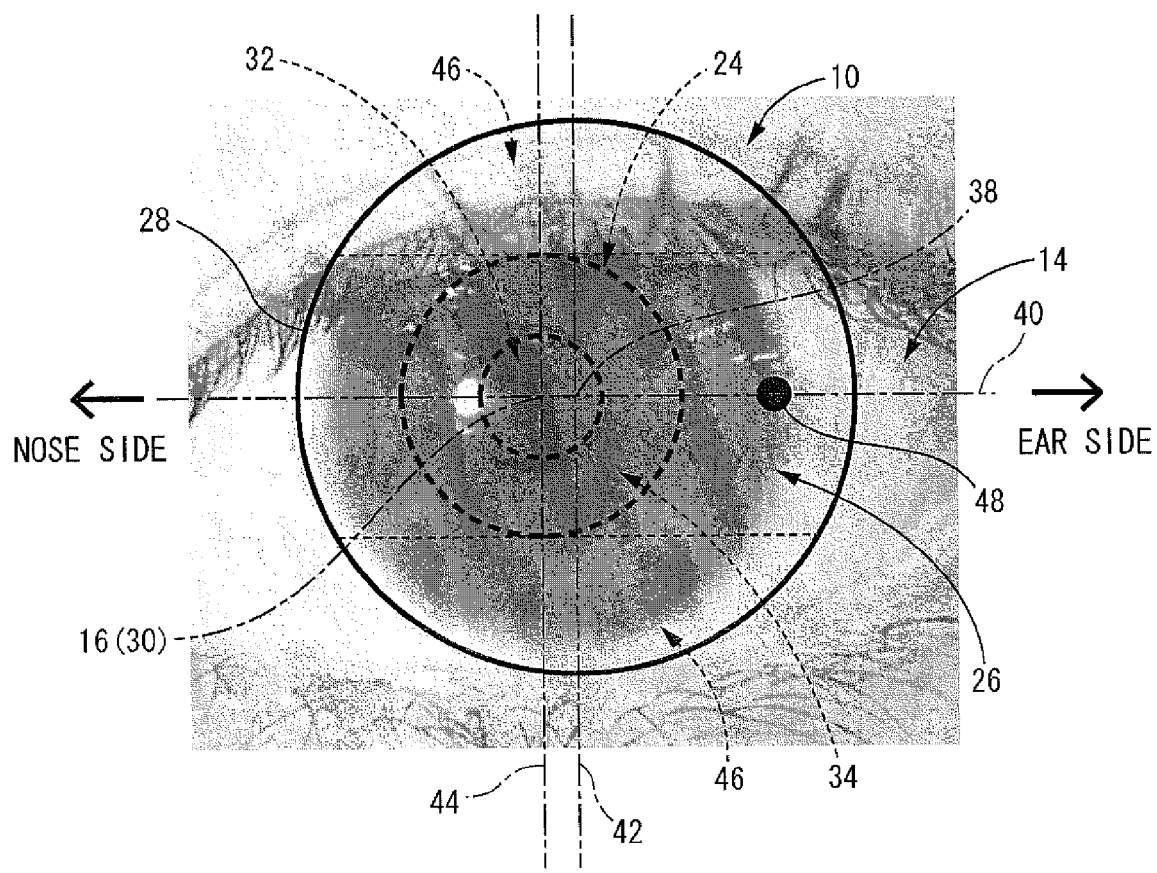
FIG. 5 is a front view suitable for explaining a worn condition of the contact lens of the present embodiment on a human eye.

That is, as shown in FIG. 5, the contact lens 10 having a myopia progression suppression capability worn on the human eye 14 is likely to stabilize at a position offset from the center of the cornea 12 toward the ear due to the difference in curvature radius of the cornea 12 and conjunctiva and the difference in the direction and distribution of the eyelid pressures exerted between the nose side and ear side. Therefore, the optical axis center 30 of the contact lens 10 under a worn condition is positioned on the axis of the line of sight 16 by means of setting the value of eccentricity δ of the optical axis center 30 in response to the positional deviation between the pupil center and the lens geometric center 38 at the stabilized position.

FIG. 5 is a photo-based diagram, which shows the edge portion 28 of the contact lens 10, the outer edge of the optical part 24, and the outer edge of the central region 32 where the optical axis center 30 is set and the like, each indicated by an emphasizing line for easy confirmation of the contact lens 10 having a myopia progression suppression capability under a worn condition. Although such contact lens 10 is generally used by being worn on each of the wearer's eyes, FIG. 5 shows only the left eye. In the right eye, the contact lens 10 is used by positioning it in the circumference direction to make the eccentric direction of the optical axis center 30 toward the nose side by having it worn rotated 180 degrees from the position of FIG. 5, whereby the optical axis center 30 is positioned on the axis of the line of sight 16 of the right eye.

Accordingly, as shown in FIG. 1, the contact lens 10 of the present embodiment having a myopia progression suppression capability is capable of reducing the amount of positional deviation between the line of sight 16 of the human eye 14 and the lens optical axis 18 (optical axis center 30) even when the stabilized position on the cornea 12 is shifted toward the ear, and more preferably, it is capable of aligning the line of sight 16 and the lens optical axis 18 (optical axis center 30) under a worn condition. Therefore, without excessively heightening the additional power required to set the focus on or before the retina all across the retinal peripheral region, it becomes possible to evenly set the focus in the retinal peripheral region at a position closer to the retina. As a result, it is now possible to enjoy the equivalent effect of myopia progression suppression even by setting the additional power lower than that of the contact lens for myopia progression suppression with a conventional structure. That is, by setting a positive additional power in the peripheral region 34 as compared to the central region 32, the progression of the myopia and myopic astigmatism above and beyond the refractive correction power set in the central region 32 can be restricted.

Furthermore, by reducing the amount of positional deviation between the line of sight 16 of the human eye 14 and the lens optical axis 18 (optical axis center 30), it becomes possible to keep down the asymmetrical high-order aberration such as coma aberration in addition to setting the additional power low. Therefore, the quality of vision (QOV) of the contact lens 10 having a myopia progression suppression capability in a worn condition can be well maintained at the same level as that of a regular contact lens for refractive correction, thus enabling to obtain the intended effect of myopia progression suppression while significantly reducing the burden on the lens wearer.

In addition, by keeping the amount of positional deviation small enough between the line of sight 16 of the human eye 14 and the lens optical axis 18 (optical axis center 30), generation of asymmetrical high-order aberration such as coma aberration is restricted, so that only spherical aberration assigned to the optical part 24 by setting an additional power is effectively exerted. This can be used as depth of focus by which the quality of vision (QOV) is well maintained even with some deviation between the foci. Thus, by having a wider range of good vision due to the increase in the depth of focus, further improvements can be expected to the corrective effect of hyperopic focal error especially around the retinal fovea.

As evident from the description above, the contact lens 10 with the structure according to the present invention has an effective myopia progression suppression capability as well as good QOV at the same time. Therefore, the contact lens related to the present invention does not limit its use to myopia progression suppression, but can be used, for example, as a contact lens for refractive correction that corrects common myopia and myopic astigmatism that is not intended for myopia progression suppression.

Specific configurations of the contact lens having a myopia progression suppression capability have been exemplified above as a first embodiment of the contact lens 10 taking into account the off-axis aberration theory, but the present invention can also be applied to a contact lens having a myopia progression suppression capability taking into account the accommodation lag theory and its specific configurations will be exemplified below as a second embodiment. In the following paragraphs, detailed descriptions of substantially the same members and parts as those of the first embodiment are omitted by assigning the same numerals to the equivalent components in the drawings.

The basic structure of the contact lens of the present embodiment is the same as that of the first embodiment, having not only the same material but also the basic shape as shown in FIGS. 2 and 3 and the optical part formed with the optical center offset from the lens geometric center as well as the positioning member in the circumference direction under a worn condition of the lens in the same way as the contact lens 10 of the first embodiment.

Figure 6:
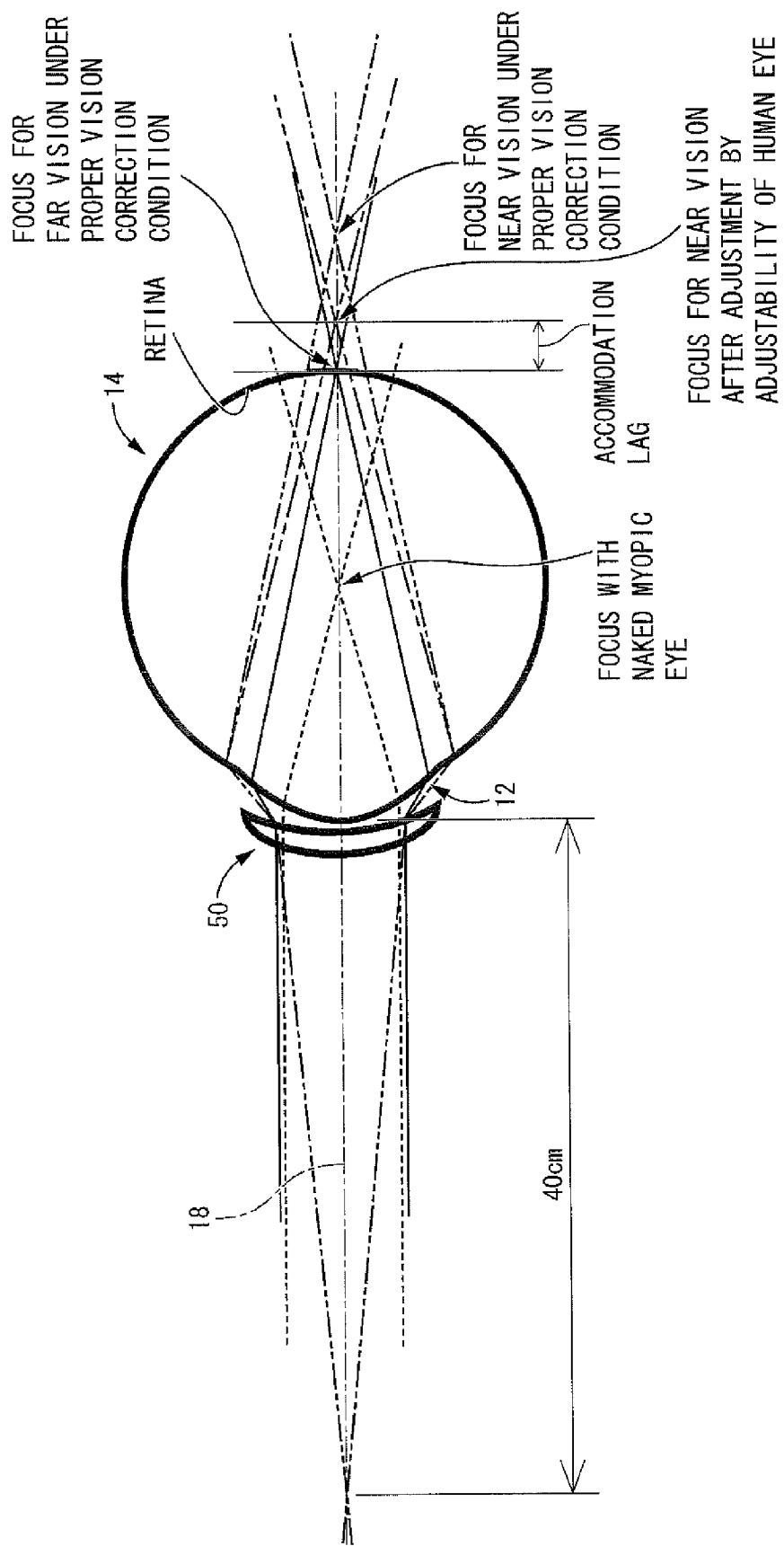
FIG. 6 is a longitudinal cross sectional view suitable for explaining optical properties and myopia progression suppression effects of a contact lens as a second embodiment of the present invention.
Figure 7:
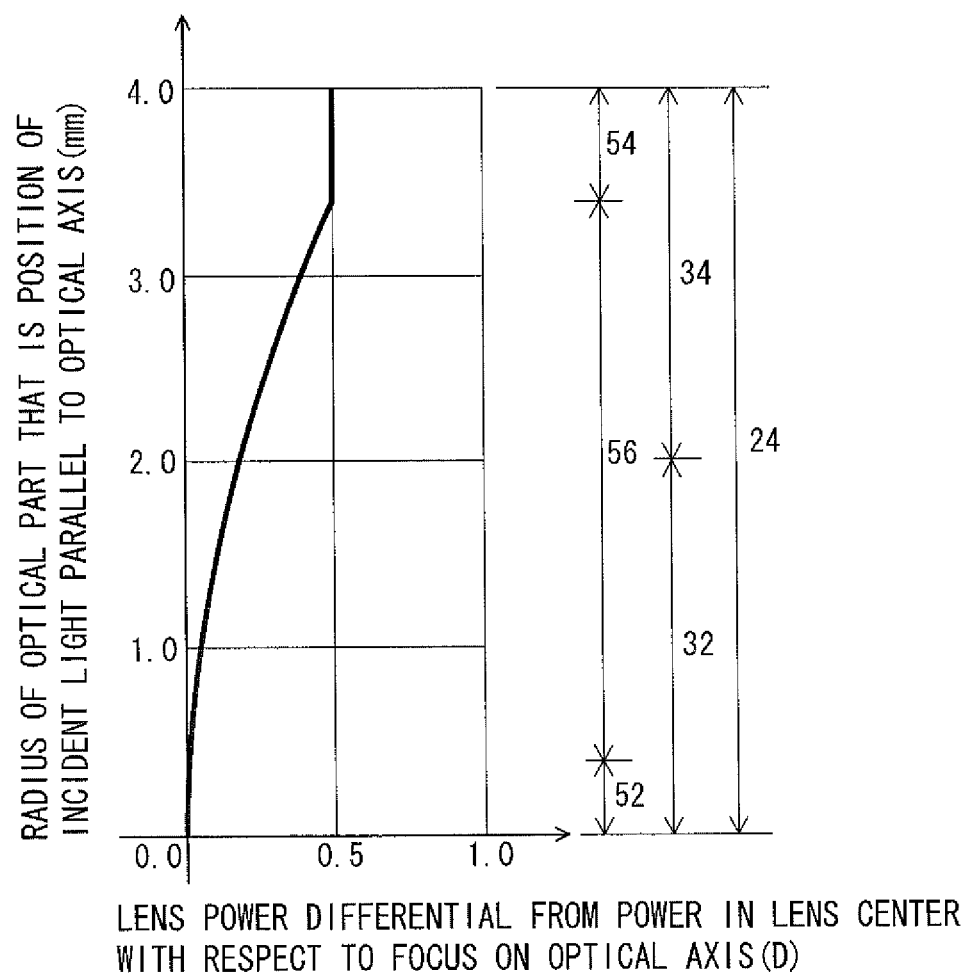
FIG. 7 is a graph for explaining an additional power set in an optical part of the contact lens as the second embodiment shown in FIG. 6.

Meanwhile, as shown in FIG. 6, a contact lens 50 of the present embodiment has optical properties in its optical part differentiated from those of the first embodiment. More specifically, as shown in FIG. 7, a proper vision correction region 52 is provided where a proper vision correction power of constant value to provide a proper vision for far vision is set at the center of the central region 32 on the lens optical axis 18 that gives a correction power for far vision. The proper vision correction power means a lens power required to create a condition of proper vision correction by means of correcting the focal position on the optical axis along the dash line in FIG. 6 representing the optical properties of the myopic naked eye and setting a focus around the retinal fovea.

Also, the proper vision correction region 52 can be set in an appropriate size considering the wearer's living environment and naked vision and the like, which can be suitably set in a range of more than 0 mm and less than 5 mm in diameter around the lens optical axis 18 of the optical part 24. By having the proper vision correction region formed with a diameter of more than 0 mm, the corrective effect of vision in the proper vision correction region is favorably exerted. Also the proper vision correction region is preferably formed with a diameter of less than 5 mm, whereby any excessive visual inhibition can be avoided in far vision. The lens power set in the proper vision correction region 52 can only be substantially constant and any lens power variation to the extent of the spherical aberration that appears in a monofocal lens has no optically adverse effect and can well be allowed.

Meanwhile, under a vision correction condition created by the proper vision correction power set up in the proper vision correction region 52, the focus on the lens optical axis 18 is positioned on the retina when parallel light rays are incident thereon assuming a situation of far vision, and under this "proper vision correction condition," the focus with a naked eye indicated by the dash line in FIG. 6 is corrected to the position of the properly corrected focus on the retina as indicated by the solid line in FIG. 6. However, in a situation of near vision like reading a book 40 cm away from the eye, correction of myopia turns out excessive when a contact lens under the "proper vision correction condition" is worn, as indicated by the two-dotted line in FIG. 6, and the focus is formed behind the retina on the lens optical axis 18. This focus behind the retina is brought to a condition of clear vision by being adjusted to the retinal position due to the adjustability remaining in the wearing eye.

However, since the focal position of the eye for near vision is generally adjusted to the extent not to reach the proper position (accommodation lag theory), the light does not reach the retina on the lens optical axis 18, as indicated by the two-dotted line in FIG. 6, forming a focus at a position behind the retina. This phenomenon is called "accommodation lag," which is seen as lack of diopter accommodation by somewhere between 0.50 and 0.75 diopter in average in youths aged 20 to 25 in response to an accommodation stimulus set at 40 cm in front of the eye. According to the accommodation lag theory, the lack of accommodation of the human eye in near vision is considered to be one of the causes of myopia progression due to the growth of the ocular axis.

Under these circumstances, the contact lens of the present embodiment, as shown in FIG. 7, is provided with an accommodative insufficiency compensation region 54 where an accommodative insufficiency compensation power of substantially constant value that compensates the lack of accommodation for near vision is set in the peripheral region 34 of the optical part 24. The accommodative insufficiency compensation power means a lens power required to create a condition of proper vision correction in near vision by correcting the position of the focus in an excessively corrected condition that appears in near vision under a proper vision correction condition generated by the proper vision correction power set in the central region 32 of the contact lens 50 as shown in FIG. 6. The correction is performed by supplementally compensating the lack of accommodation by an amount that corresponds to the accommodation lag to set the focus around the retinal fovea.

Also, the accommodative insufficiency compensation region 54 can be set at an appropriate size taking into account the wearer's living environment and the like, and is preferably set in an annular shape with a radial width of 0.10 mm or more in the region of not less than 2 mm in diameter around the lens optical axis 18 of the optical part 24. The lens power set in the accommodative insufficiency compensation region 54 can be substantially constant, and any lens power variation to the extent of the spherical aberration that appears in a monofocal lens has no optically adverse effect and can well be allowed.

Especially in the present embodiment, a transition region 56 is set between the outer periphery of the proper vision correction region 52 in the central region 32 and the accommodative insufficiency compensation region 54 in the peripheral region 34. The transition region 56 stretches over both the central region 32 and the peripheral region 34 and is formed with a lens power gradually changing from the level of proper vision correction to that of accommodative insufficiency compensation. Such transition region 56 is not indispensable, but by means of providing the transition region 56, some effects such as an increase in depth of focus described in the first embodiment and improvements to QOV by preventing failures such as the image jump can be achieved.

Because of the provision of this accommodative insufficiency compensation region 54, the contact lens 50 of the present embodiment sets the focus in near vision on the optical axis at +0.5 diopter ahead so as to compensate the lack of accommodation in response to an accommodation stimulus in near vision at about 40 cm in front of the eye like when reading a book, while maintaining the eyesight for outdoor activities or the like with a focus for far vision under a condition of proper vision correction in setting a focus on the lens optical axis as well as the line-of-sight axis.

Then, using the contact lens 50 of the present embodiment, a clear focus for far vision can be obtained despite a small pupil size like in daylight activities by means of providing the proper vision correction region 52 that gives a proper vision to the central region 32 assuming the case of far vision outdoors. Meanwhile, considering an indoor situation of reading, gaming, and working on a mobile device or a personal computer or the like, the accommodative insufficiency compensation region 54 is provided as an additional power region with a constant positive diopter as compared to the proper vision correction power without regard thereof so as to compensate the lack of accommodation in near vision in the peripheral region 34 without excessive myopia correction applied to the focus. Thus, the contact lens 50 of the present embodiment has established a new theory of myopia progression suppression by adjusting the focal position on the optical axis in near vision, especially in consideration for the modern life of children and youths who often experience near vision, and its effects have been proven as shown in the following examples.

FIG. 8 shows appearances of Landolt rings as a result of simulation of optical images on the retina with focal errors of +0.25 D and +0.50 D generated in the contact lens having a myopia progression suppression capability with the structure according to the second embodiment (Example 1) where the additional power of +0.5 D is set in the accommodative insufficiency compensation region. FIG. 8 also shows, as Comparative Example 1, a contact lens for myopia progression suppression set with the same additional power, wherein the optical axis center is not set eccentrically and the line of sight and the lens optical axis are offset to each other by 0.5 mm. In order to obtain these simulation results, the optical design software ZEMAX Engineering Edition by ZEMAX Development Corporation was used.

Next, Table 1 shows test results of myopia progression suppression effect of a contact lens having a myopia progression suppression capability with the structure according to the second embodiment (Example 2) and the contact lens for myopia progression suppression with a conventional structure (Comparative Examples 2 and 3). The test results of Comparative Example 2 are based on the Non-Patent Document 1 "Investigative Ophthalmology & Visual Science, 2011; 52: 9362-9367" by Sankaridurg et al. The test results of Comparative Example 3 are based on Non-Patent Document 2 "Ophthalmology, 2011; 118:1152-1161" by Anstice et al.

In these effect tests, the amount of change in the length of ocular axis and the amount of change in ocular refraction power (objective refraction value) of each of the subjects who wore test lenses and control lenses were measured. That is, the length of ocular axis and the ocular refraction power (objective refraction value) of each subject were first measured before testing by a light-interference type optical biometer, a wavefront sensor, or a binocular open-field auto-refractometer. Thereafter, each subject wore the test lens or the control lens for a given period of time to measure the length of ocular axis and ocular refractive power after the test period. The amounts of changes in the length of ocular axis and the ocular refractive power of each subject were calculated this way before and after the test period. These effect tests were conducted on children ages from 7 to 16.

In each of the effect tests for Example 2 and Comparative Examples 2 and 3, the following instruments were used as a light-interference type optical biometer, a wavefront sensor, or a binocular open-field auto-refractometer for measuring the length of ocular axis and ocular refractive power:

Example 2

Length of ocular axis: IOLMaster by Carl Zeiss AG
Refractive power: KR-9000 PW by Topkon Corporation Comparative Example 2

Length of ocular axis: IOLMaster by Carl Zeiss AG
Refractive power: SHIN-NIPPON NVision-K5001 by Rexxam Co., Ltd.

Comparative Example 3

Length of ocular axis: IOLMaster by Carl Zeiss AG
Refractive power: HARK-599 by Carl Zeiss AG
Under these circumstances, in the effect tests of Example 2 and Comparative Examples 2 and 3, monofocal soft

TABLE 1

| | | Example 2 | Comparative Example 2 | Comparative Example 3 |
|---|---|---|---|---|
| Test period | | 11 months | 12 months | 10 months |
| Number of subjects | | 24 (Test: 11; Control: 13) | 85 (Test: 45; Control:40) | 40 |
| Control lens | | Monofocal soft contact lens | Monofocal glasses | Monofocal soft contact lens |
| Max. additional power of test lens | | 0.50D | 2.00D | 2.00D |
| Change in ocular axis | Test lens | 0.09 mm | 0.24 mm | 0.11 mm |
| | Control lens | 0.17 mm | 0.39 mm | 0.22 mm |
| | Inhibition rate | 47% | 33% | 49% |
| Change in objective refraction value | Test lens | −0.34D | −0.54D | −0.44D |
| | Control lens | −0.50D | −0.84D | −0.69D |
| | Inhibition rate | 32% | 34% | 37% |
| Reference literature | | | Sankaridurg P, Holden B, Smith EL et al, "Decrease in Rate of Myopia Progression with a Contact Lens Designed to Reduce Relative Peripheral Hyperopia: One-year Results," Investigative Ophthalmology & Visual Science 2011; 52: 9362-9367. | Anstice et al, "Effect of Dual-focus Soft Contact Lens Wear on Axial Myopia Progression in Children," Ophthalmology 2011; 118: 1152-1161. | contact lenses, monofocal glasses, and monofocal soft contact lenses were used, respectively, as control lenses. Also, as described above, the test lenses for Example 2 are contact lenses having a myopia progression suppression capability with the structure according to the second embodiment, and the accommodative insufficiency compensation power which is the maximum additional power of the test lens was set at +0.5 D. The test lenses for Comparative Examples 2 and 3 are contact lenses for myopia progression suppression with a conventional structure. More specifically, the test lens of Comparative Example 2 has a region in its center where abnormal refraction is corrected, while having regions where the additional power is gradually raised up to +2.0 D in the outer periphery of the central region. Meanwhile, the test lens of Comparative Example 3 has a correction region (C1) in its center where abnormal refraction is corrected, while having regions with an additional power of +2.0 D (T1, T2) and correction regions (C2, C3) provided alternately in the outer periphery of such central region (see Non-Patent Document 2, FIG. 1.A).

After such testing, each average amount of changes in the length of ocular axis and the ocular refractive power was calculated for Example 2 and Comparative Examples 2 and 3, respectively, to determine each inhibition rate ((Amount of change in the control lens−Amount of change in the test lens)/(Amount of change in the control lens)×100).

As a result, despite the fact that the maximum additional power of the test lens of Example 2 was +0.5 D, whereas the maximum additional power of the test lens of Comparative Examples 2 and 3 was +2.0 D, no significant difference was found between them in the inhibition rate of the change in length of ocular axis and the amount of change in ocular refractive power. This allows us to confirm that the contact lens having a myopia progression suppression capability with the structure according to the second embodiment can achieve an effect of myopia progression suppression equivalent to that of the contact lens for myopia progression suppression with a conventional structure while keeping the additional power lower than the latter.

In addition, in the contact lens with the structure according to the second embodiment, it is obvious that the diopter value in a range from +0.50 to 0.75 diopter is favorably adopted as accommodative insufficiency compensation power from the fact that the lack of accommodation at 0.50 to 0.75 diopter in average is measured in youths ages from 20 to 25 in response to an accommodation stimulus set at 40 cm in front of the eye, but such accommodative insufficiency compensation power can be calculated from the operation described as follows. That is, since the amount of the lack of accommodation, or accommodation lag, is expressed by "the difference between the power of accommodation actually used and the amount of the actual accommodation stimulus," the accommodation stimulus 40 cm in front of the eye is expressed by 100/40=2.5 D, and assuming that the power of accommodation required for staring at it is 2.0 D, the amount of the lack of accommodation turns out to be 2.5−2.0=0.5 D. As to the power of accommodation, if refracting power of a myopic individual wearing a lens with the power for proper vision correction of 2 D and staring at 40 cm in front of the eye is measured at 4 D, the power of accommodation actually used would be −2 D−(−4 D)=2 D.

Also, it is obvious that the diopter value of +0.50 to 0.75 D is more favorable as the accommodative insufficiency compensation power from the test results in Table 2 below showing subjective measurements of the accommodative insufficiency compensation as well as subjective measurements of vision clarity in far and near visions and contrast feeling with contact lenses having the structure according to the second embodiment, as is the case for test lenses of Example 2, wherein the accommodative insufficiency compensation power, or the maximum additional power, was set at +0.50 D, +0.75 D and +1.0 D, respectively, for each contact lens of Examples 3, 4 and 5.

TABLE 2

| Test items | | | Test Lens addition | | |
|---|---|---|---|---|---|
| | | | Example 3 (+0.50 D) | Example 4 (+0.75 D) | Example 5 (+1.00 D) |
| Vision corrected by CL | | | N.S. | N.S. | X |
| Compensation for lack of accommodation | | Binocular | ○ | ○ | ○ |
| | | Monocular | ○ | ○ | ○ |
| Clarity of vision | Far | Binocular | N.S. | N.S. | X |
| | | Monocular | N.S. | N.S. | N.S. |
| | Near | Binocular | N.S. | N.S. | X |
| | | Monocular | N.S. | N.S. | N.S. |
| Contrast feeling | Dark & far | 100% Binocular | N.S. | N.S. | X |
| | | Monocular | N.S. | N.S. | X |
| | | 10% Binocular | N.S. | N.S. | X |
| | | Monocular | X | X | X |
| | Bright & far | 100% Binocular | N.S. | N.S. | N.S. |
| | | Monocular | N.S. | N.S. | X |
| | | 10% Binocular | N.S. | N.S. | N.S. |
| | | Monocular | N.S. | N.S. | X |
| | Bright & near | 100% Binocular | N.S. | N.S. | ○ |
| | | Monocular | N.S. | N.S. | ○ |
| | | 10% Binocular | N.S. | N.S. | N.S. |
| | | Monocular | N.S. | X | N.S. |

In Table 2 above, "N.S." means "statistically non-significant measurement results compared to those of monofocal contact lenses used as a control." The x-mark indicates "measurement results inferior in statistical significance compared to those of monofocal contact lenses used as a control," whereas the ○-mark indicates "measurement results superior in statistical significance compared to those of monofocal contact lenses used as a control." Here, in these experiments, "2-week Acuvue" (registered trademark) lenses by Johnson & Johnson Services Inc. were used for monofocal contact lenses as a control. Also, the tests were conducted on 22 subjects with 44 eyes. In Table 2, the line of "Vision corrected by CL" indicates visions with the contact lenses of Examples 3, 4 and 5, respectively, as compared to those with monofocal contact lenses as a control, and "Compensation for lack of accommodation" indicates how the range of bright vision expands toward the near vision side when contact lenses of Examples 3, 4 and 5 are worn as compared to the case where monofocal contact lenses are worn as a control. Also, "Clarity of vision" indicates a comparison of how the image can be seen without blurring etc. between contact lenses of Examples 3, 4 and 5 and monofocal contact lenses as a control. Furthermore, "Contrast feeling" indicates a comparison of visual appearance of images between those with 100% contrast and 10% contrast placed at a given distance when contact lenses of Examples 3, 4 and 5 and monofocal contact lenses as a control were worn, respectively.

The present invention has been described above, but the present invention is not to be interpreted based only on the embodiments and examples described above. Although not listed one by one, the present invention should be made in aspects that are modified, corrected and improved in various ways based on the knowledge of those skilled in the industry, and such embodiments are all within a range of the present invention as long as they do not deviate from the intention thereof.

For example, the outer shapes of the optical part and the lens adopted in the contact lens related to the present invention do not have to be circular as described in the above embodiments, but an oval shape, for example, can be adopted.

Also, the contact lens related to the present invention is often offered to the market as a series that combines multiple types of lenses with each value setting modified at appropriate intervals. More specifically, in order to respond to the degree of myopia of each wearer, lenses with multiple types of optical properties with mutually different values can be combined with each other to be set in the optical part 24 as refractive correction power that corrects myopia and myopic astigmatism to be offered to the market as a contact lens set having a myopia progression suppression capability. Meanwhile, as to the magnitude of the additional power set in the optical part 24, lenses with multiple types of optical properties with mutually different values of additional power set therein need to be offered in order to respond to the retinal configuration and the like of each wearer.

Under these circumstances, it is possible to prepare a full range of additional power per each refractive correction power, but especially the magnitude of additional power required according to the magnitude of such refractive correction power tends to differ in the contact lens having a myopia progression suppression capability based on the off-axis aberration theory such as the contact lens 10 described above in the first embodiment. In general, the higher the negative diopter value of the lens for refractive correction is, the higher the required positive diopter value of the required additional power is. Therefore, the higher the negative diopter value of the refractive correction power is set, the higher the positive diopter value of the additional power is set, enabling to efficiently offer the contact lens with a suitable additional power depending on the degree of myopia progression per each patient by means of offering a combination of contact lenses having multiple types of myopia progression suppression capabilities to the market.

Especially, considering the users of contact lenses related to the present invention having a myopia progression suppression capability, it is more efficient to market contact lens sets having a myopia progression suppression capability combining at least contact lenses with multiple types of optical properties wherein the refractive correction power is set in a range from −0.25 to −10 diopters and the maximum value of the additional power is set in a range from +0.25 to less than 1.00 diopter.

Meanwhile, since the contact lens having a myopia progression suppression capability based on the accommodation lag theory such as the contact lens 50 described in the second embodiment sets an accommodative insufficiency compensation power in near vision at a particular distance based on the condition corrected to give a proper far vision, the required magnitude of the additional power can be set almost constant regardless of the magnitude of the proper vision correction power set in the proper vision correction region. Generally, since the distance for near vision is set at around 40 cm considering the wearer's living environment and the like, the accommodative insufficiency compensation power is set in a range from +0.5 to +0.75 diopter relative to the proper vision correction power, and more preferably, an accommodative insufficiency compensation power of constant value is set without regard to the magnitude of the proper vision correction power.

Therefore, in the contact lens set including the contact lens 50 described in the second embodiment, it is more efficient to adopt a combination of contact lenses with mutually different values of proper vision correction power set in the proper vision correction region, while setting the accommodative insufficiency compensation power in the accommodative insufficiency compensation region of each lens at a constant value in a range from +0.5 to +0.75 diopter relative to the corresponding proper vision correction power regardless of the value thereof.

Although the contact lens related to the present invention having a myopia progression suppression capability can achieve the technical effect described above even if the lens optical axis 18 (optical axis center 30) is not completely aligned with the line of sight 16 of the human eye 14 in a worn condition, it is desirable to keep the amount of deviation small enough between the line of sight 16 of the human eye 14 and the lens optical axis 18 (optical axis center 30), preferably under 0.5 mm. In order to limit such deviation, it is statistically desirable to set the value of eccentricity δ of the optical axis center 30 relative to the lens geometric center 38 in a range from 0.25 to 1.25 mm, and more preferably in a range from 0.25 to 0.75 mm. Considering the individual variation in the value of eccentricity of the lens at a stable position under a worn condition, it is also possible to market contact lenses having multiple types of myopia progression suppression capabilities, as part of the above-mentioned series, wherein the values of eccentricity δ of the optical axis center 30 relative to the lens geometric center 38 are set at mutually different values.

In the embodiment described above, the eccentric direction of the optical axis center 30 of the optical part 24 relative to the lens geometric center 38 was made nearly horizontal under a worn condition, but it is not always necessarily. That is, in the present invention, is acceptable as long as the lens optical axis 18 (optical axis center 30) of the optical part 24 is offset to align with the line of sight 16 of the human eye 14 from the lens geometric center 38, and the optical axis center 30 of the optical part 24 can go off the horizontal line that passes through the lens geometric center 38. In short, the eccentric direction line 40 does not have to extend horizontally under a worn condition of the lens, but can be inclined against the horizontal axis. Such an inclination angle can either be set, for example, according to the corneal configuration of each wearer and the stable position of the lens, or based on the average value and the like of such data from multiple wearers.

Although the mark 48 is placed on the eccentric direction line 40 or the perpendicular direction line 42 in the embodiment described above, it is not always necessary, and the mark 48 can go off the eccentric direction line 40 or the perpendicular direction line 42 as long as the particular position in the circumference direction corresponding to the eccentric direction of the optical axis center 30 of the contact lens 10 is distinguishable.

KEYS TO SYMBOLS

10, 50: Contact lens (having a myopia progression suppression capability); 14: Human eye; 16: Line of sight; 18: Lens optical axis; 20: Lens front surface; 22: Lens back surface; 24: Optical part; 30: Optical axis center; 32: Central region; 34: Peripheral region; 36: Maximum additional power portion; 38: Lens geometric center; 46: Slab-off region; 52: Proper vision correction region; 54: Accommodative insufficiency compensation region.

The invention claimed is:

1. A contact lens having a myopia progression suppression capability whose optical part includes a refractive correction power set in a central region for correcting myopia and myopic astigmatism, wherein:
a positive additional power as compared to a power in the central region is set in a peripheral region of the optical part to correct a hyperopic focal error in order to suppress progression of myopia and myopic astigmatism beyond the refractive correction power set in the central region;
a positioning member that specifies a circumferential position of the lens under a worn condition is provided;
a lens optical axis of the optical part is set offset from a lens geometric center to align with a line of sight of a human eye under the worn condition produced by the positioning member, and
a positive spherical aberration is given to the optical part due to the additional power set in the peripheral region of the optical part while the lens optical axis of the optical part is set offset from a lens geometric center to align with the line of sight of the human eye under the worn condition due to the positioning member as well as an offset structure of the lens optical axis of the optical part so that a depth of focus increases without causing any reduction of subjective QOV associated with an increase in asymmetrical high-order aberration such as coma aberration.

2. The contact lens having the myopia progression suppression capability according to claim 1, wherein a maximum value of the additional power set in the peripheral region of the optical part is in a range from +0.25 to less than +1.00 diopter.

3. The contact lens having the myopia progression suppression capability according to claim 1, wherein the additional power in the peripheral region of the optical part is set to change gradually without steps from a center side of the optical part toward an outer peripheral side thereof so as to increase an amount of correction of the focal error.

4. The contact lens having the myopia progression suppression capability according to claim 3, wherein the additional power in the peripheral region of the optical part is set to change gradually without steps from the center side of the optical part toward the outer peripheral side thereof so as to increase the amount of correction of the focal error, and in an outermost periphery of the peripheral region of the optical part, a region of maximum and constant additional power is provided in an annular shape with a prescribed width.

5. The contact lens having the myopia progression suppression capability according to claim 1, wherein the additional power in the peripheral region of the optical part is set to change in steps from a center side of the optical part toward an outer peripheral side thereof so as to increase an amount of correction of the focal error.

6. The contact lens having the myopia progression suppression capability according to claim 1, wherein an optical surface that gives the additional power in the peripheral region of the optical part is set on at least one of lens front and back surfaces.

7. The contact lens having the myopia progression suppression capability according to claim 1, wherein an optical surface that gives a cylindrical lens power for astigmatism correction is set on at least one of the lens front and back surfaces of the optical part.

8. The contact lens having the myopia progression suppression capability according to claim 1, wherein the refractive correction power is set in the central region that gives a proper vision in a central portion of a retina on the lens optical axis, while the additional power is set in the peripheral region that gives a focus around the retina.

9. The contact lens having the myopia progression suppression capability according to claim 1, wherein
the central region includes a proper vision correction region where a proper vision correction power of substantially constant value is set to give a proper vision on the lens optical axis of the optical part for far vision, and
the peripheral region includes an accommodative insufficiency compensation region where an accommodative insufficiency compensation power of substantially constant value is set as the additional power to compensate lack of accommodation on the lens optical axis of the optical part for near vision.

10. The contact lens having the myopia progression suppression capability according to claim 9, wherein the accommodative insufficiency compensation power is set in a range from +0.5 to +0.75 diopter relative to the proper vision correction power.

11. The contact lens having the myopia progression suppression capability according to claim 9, wherein the proper vision correction region is set with a diameter of more than 0 mm and less than 5 mm around the lens optical axis of the optical part.

12. The contact lens having the myopia progression suppression capability according to claim 9, wherein the accommodative insufficiency compensation region is set in a region of not less than 2 mm in diameter around the lens optical axis of the optical part in an annular shape with a prescribed width.

13. A contact lens set having a myopia progression suppression capability that combines contact lenses with multiple types of optical properties each of which is a contact lens having a myopia progression suppression capability whose optical part includes a refractive correction power set in a central region for correcting myopia and myopic astigmatism, wherein:
a positive additional power as compared to a power in the central region is set in a peripheral region of the optical part to correct a hyperopic focal error in order to suppress progression of myopia and myopic astigmatism beyond the refractive correction power set in the central region;
a positioning member that specifies a circumferential position of the lens under a worn condition is provided;
a lens optical axis of the optical part is set offset from a lens geometric center to align with a line of sight of a human eye under the worn condition produced by the positioning member, and in which mutually different values are set to the contact lenses as the refractive correction power in the central region of the optical part, wherein:
the higher a negative diopter value of the refractive correction power in the central region of the optical part is set, the higher the positive additional power is set in the peripheral region of the optical part; and
a positive spherical aberration is given to the optical part due to the additional power set in the peripheral region of the optical part while the lens optical axis of the optical part is set offset from a lens geometric center to align with the line of sight of the human eye under the worn condition due to the positioning member as well as an offset structure of the lens optical axis of the optical part so that a depth of focus increases without causing any reduction of subjective QOV associated with an increase in asymmetrical high-order aberration such as coma aberration.

14. The contact lens set having the myopia progression suppression capability according to claim 13 comprising the contact lenses with multiple types of optical properties, wherein
each refractive correction power in the central region of the optical part is set in a range from −0.25 to −10 diopters, and
an upper limit of the additional power in the peripheral region of the optical part is set in a range from +0.25 to less than +1.00 diopter.

15. A contact lens set having a myopia progression suppression capability that combines contact lenses with multiple types of optical properties each of which is a contact lens having a myopia progression suppression capability whose optical part includes a refractive correction power set in a central region for correcting myopia and myopic astigmatism, wherein:
a positive additional power as compared to a power in the central region is set in a peripheral region of the optical part to correct a hyperopic focal error in order to suppress progression of myopia and myopic astigmatism beyond the refractive correction power set in the central region;
a positioning member that specifies a circumferential position of the lens under a worn condition is provided;
a lens optical axis of the optical part is set offset from a lens geometric center to align with a line of sight of a human eye under the worn condition produced by the positioning member;
a positive spherical aberration is given to the optical part due to the additional power set in the peripheral region of the optical part while the lens optical axis of the optical part is set offset from a lens geometric center to align with the line of sight of the human eye under the worn condition due to the positioning member as well as an offset structure of the lens optical axis of the optical part so that a depth of focus increases without causing any reduction of subjective QOV associated with an increase in asymmetrical high-order aberration such as coma aberration;
the central region includes a proper vision correction region where a proper vision correction power of substantially constant value is set to give a proper vision on the lens optical axis of the optical part for far vision; and
the peripheral region includes an accommodative insufficiency compensation region where an accommodative insufficiency compensation power of substantially constant value is set as the additional power to compensate lack of accommodation on the lens optical axis of the optical part for near vision, and in which mutually different values are set to the contact lenses as the proper vision correction power in the proper vision correction region of the optical part, wherein:
the accommodative insufficiency compensation power in the accommodative insufficiency compensation region is set at a constant value in a range from +0.5 to +0.75 diopter relative to the proper vision correction power without regard to a value thereof in the proper vision correction region.

* * * * *